(12) United States Patent  
Vian et al.

(10) Patent No.: US 8,392,045 B2
(45) Date of Patent: Mar. 5, 2013

(54) SYSTEM AND METHODS FOR AIRCRAFT PREFLIGHT INSPECTION

(75) Inventors: John L. Vian, Renton, WA (US); Emad W. Saad, Renton, WA (US)

(73) Assignee: The Boeing Company, Chicago, IL (US)

( * ) Notice: Subject to any disclaimer, the term of this patent is extended or adjusted under 35 U.S.C. 154(b) by 817 days.

(21) Appl. No.: 12/205,658

(22) Filed: Sep. 5, 2008

(65) Prior Publication Data

US 2010/0063650 A1 Mar. 11, 2010

(51) Int. Cl.
*G06F 19/00* (2006.01)
*G05D 1/00* (2006.01)

(52) U.S. Cl. .................. 701/28; 434/4; 434/30; 244/4 R; 701/3

(58) Field of Classification Search ................ 701/2, 36, 701/23, 28, 3; 348/143; 356/4.01; 345/156; 434/30, 1, 4; 244/4 R
See application file for complete search history.

(56) References Cited

U.S. PATENT DOCUMENTS

| 5,001,638 A | 3/1991 | Zimmerman et al. |
| 5,111,402 A | 5/1992 | Brooks et al. |
| 5,299,764 A * | 4/1994 | Scott ........................ 244/172.5 |
| 6,691,007 B2 | 2/2004 | Haugse et al. |
| 6,720,920 B2 | 4/2004 | Breed et al. |
| 6,928,345 B2 | 8/2005 | Quinn |
| 7,643,893 B2 * | 1/2010 | Troy et al. ........................ 700/65 |
| 7,885,732 B2 * | 2/2011 | Troy et al. ........................ 701/2 |
| 2003/0034902 A1 | 2/2003 | Dickau |
| 2004/0008253 A1 * | 1/2004 | Monroe ........................ 348/143 |
| 2006/0142903 A1 | 6/2006 | Padan |
| 2007/0039390 A1 * | 2/2007 | Duncan et al. .................. 73/606 |
| 2008/0033684 A1 | 2/2008 | Vian et al. |
| 2008/0123809 A1 * | 5/2008 | Tudor et al. ...................... 378/57 |
| 2008/0125896 A1 * | 5/2008 | Troy et al. ...................... 700/110 |
| 2009/0088896 A1 * | 4/2009 | Tobey ............................ 700/245 |
| 2009/0323046 A1 * | 12/2009 | Tan et al. ...................... 356/4.01 |

FOREIGN PATENT DOCUMENTS

| EP | 407 179 A | 1/1991 |
| GB | 2 021 261 A | 11/1979 |

OTHER PUBLICATIONS

White, Edward V.; Progress in Structural Health Management for Aerospace Vehicles; Smart Structures and Systems, Boeing—Phantom Works; slide show presentation; Mar. 27-29, 2001.

Akdenia, Aydin, Trego, Angela, Haugse, Eric; Structural Health Management Techonology Implementation on Commercial Airplanes; The Seventh Joint DoD/FAA/NASA Conference on Aging Aircraft, New Orleans, LA, Sep. 8-11, 2003; slide show presentation.

* cited by examiner

*Primary Examiner* — Ronnie Mancho
(74) *Attorney, Agent, or Firm* — Harness, Dickey & Pierce, P.L.C.

(57) ABSTRACT

A method of inspecting an aircraft. A plurality of heterogeneous unmanned vehicles are used to perform an inspection of the aircraft, each unmanned vehicle having one or more sensors. A plurality of portions of the aircraft are assigned to the vehicles for inspection based on functional capability of each vehicle. The unmanned vehicles are configured to cooperatively use the sensors to perform the inspection.

20 Claims, 11 Drawing Sheets

1 RD inspecting:
    Cockpit windows (L3, L2, L1, R1, R2, R3) from left to right
    Wipers...
    Scratches found on windows #1 and 2...Scratches limited to outer glass panes...
    >Conductive coating on outer glass panes on windows #1 and 2 intact
    >No ice buildup found I QR inspecting sensors on fuselage:
    Pitot tube
    Angle of attack vane
    Auxiliary Pitot tube
    Temperature probe
  > Pitot tube...
    >>heating unit active
    >>temperature within normal range
    >>no condensation inside tube
    >>no ice inside tube
  >Angle of attack vane...
    >>heating unit active
    >>temperature normal
    >>no condensation
    >>no ice detected...
  GV inspecting nose landing gear
  RD inspecting radome
  QR inspecting cockpit windows...
  GV deploying infrared sensor...
  Measuring tire pressure, temperature, extent of wear...
  Accessing Boeing Digital Documentation... Right Main Landing Gear...
  Boeing Company Model xxx-xxx
  Boeing Part Number xxxxxxx-xx
  Serial Number Mxxxxxxxxx

Fig. 7a

Manufacturer: xxxxxxxxx
Calculating...
Tire Tread Depth Measurement (in inches):
|  | 1 | 2 | 3 | 4 |
|---|---|---|---|---|
| Left Inboard | 12/32 | 13/32 | 13/32 | 12/32 |
| Left Outboard | 4/32 | 4/32 | 5/32 | 5/32 |

\>Alert: received operator notification - Debris found on runway
\>Accessing Database...
\>Analyzing...
\>Debris not consistent with tire Mxxxxxxxxx
\>Warning: tire retreaded
\>Alert: tread separation detected
\>Alert logged
QR inspecting underside of aileron...

(at auxiliary power unit:)
\>QR deploying acoustic sensor...
\>Fluid detected in inlet...
\>Unable to analyze...
\>Requesting assistance...
\>QR dispatched...
\>QR deploying electronic nose...
\>Smell classifier in progress...
\>Emergency: Smell consistent with compounds in de-icer fluid...
\>Emergency logged
\>RD ready to inspect next system...
\>Downloading category part list of >Empennage...
\>Retasking...
>>RD assigned to:
>>>Vertical stabilizers
>>>Rudder

Fig. 7b

>>QR assigned to:
>>>Horizontal stabilizers
>>>Elevators
>RD deploying optical sensor...
>QR deploying wave scanner...
RD and QR focus on gap between elevator and horizontal stabilizer...
>Gel-like mass found in gap...
>Gel consistent with dehydrated and frozen de-icing/anti-icing fluid...
>Emergency issued.. .Emergency logged...
RD inspecting top of fuselage...
QR_1 inspecting top part of LH wing
QR_2 inspecting bottom part of LH wing
QR inspecting guide of LH inboard trailing edge flap:
>Deploying and optical sensors...
>No anomalies found...
>QR_1 inspecting LH wing:
>>Leading edge slats
>>Leading edge flaps
>>Trailing edge flaps
>>>Outboard flap
>>>Inboard flap
>Spoilers
>QR_2 inspecting LH engine:
>>Crawl lip
>>Temperature sensors
>Sensing heat on wing leading edge slats ...
>Sensing heat on crawl lip...
>All the systems checked.
>Inspection list check...

SYSTEM AND METHODS FOR AIRCRAFT PREFLIGHT INSPECTION

FIELD

The present disclosure relates generally to aircraft and more particularly to aircraft inspection.

BACKGROUND

The statements in this section merely provide background information related to the present disclosure and do not necessarily constitute prior art.

Before an aircraft takes off for a flight, a pilot of the aircraft typically performs a preflight inspection of the aircraft. To perform the inspection, the pilot exits the cockpit, walks around the aircraft, and visually and/or manually checks various aircraft components.

SUMMARY

The present disclosure, in one implementation, is directed to a method of inspecting an aircraft. A plurality of heterogeneous unmanned vehicles are used to perform an inspection of the aircraft, each unmanned vehicle having one or more sensors. A plurality of portions of the aircraft are assigned to the vehicles for inspection based on functional capability of each vehicle. The unmanned vehicles are configured to cooperatively use the sensors to perform the inspection.

In another implementation, the disclosure is directed to a system for inspecting an aircraft. The system includes a plurality of heterogeneous unmanned vehicles each having one or more sensors and a guidance and control system configured to allow the vehicle to operate autonomously. One or more processors and memory are configured to instruct the vehicle(s) to cooperatively perform an inspection of the aircraft using the sensors to obtain sensor data relating to a plurality of possible aircraft conditions. The processor(s) and memory are further configured to interpret the sensor data to obtain inspection results.

In yet another implementation, the disclosure is directed to a method of planning an inspection of an aircraft. The method includes assigning a plurality of heterogeneous unmanned vehicles to perform the inspection, each vehicle capable of using one or more sensors in cooperation with the other vehicles to perform the inspection. The method further includes assigning each of a plurality of zones of the aircraft to each of the vehicles based on functional capability of each vehicle, and assigning to each vehicle one or more inspection tasks associated with the path.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIGS. 7A, 7B and 7C are excerpts of one or more inspection reports in accordance with one implementation of the disclosure;

DETAILED DESCRIPTION

Figure 1:
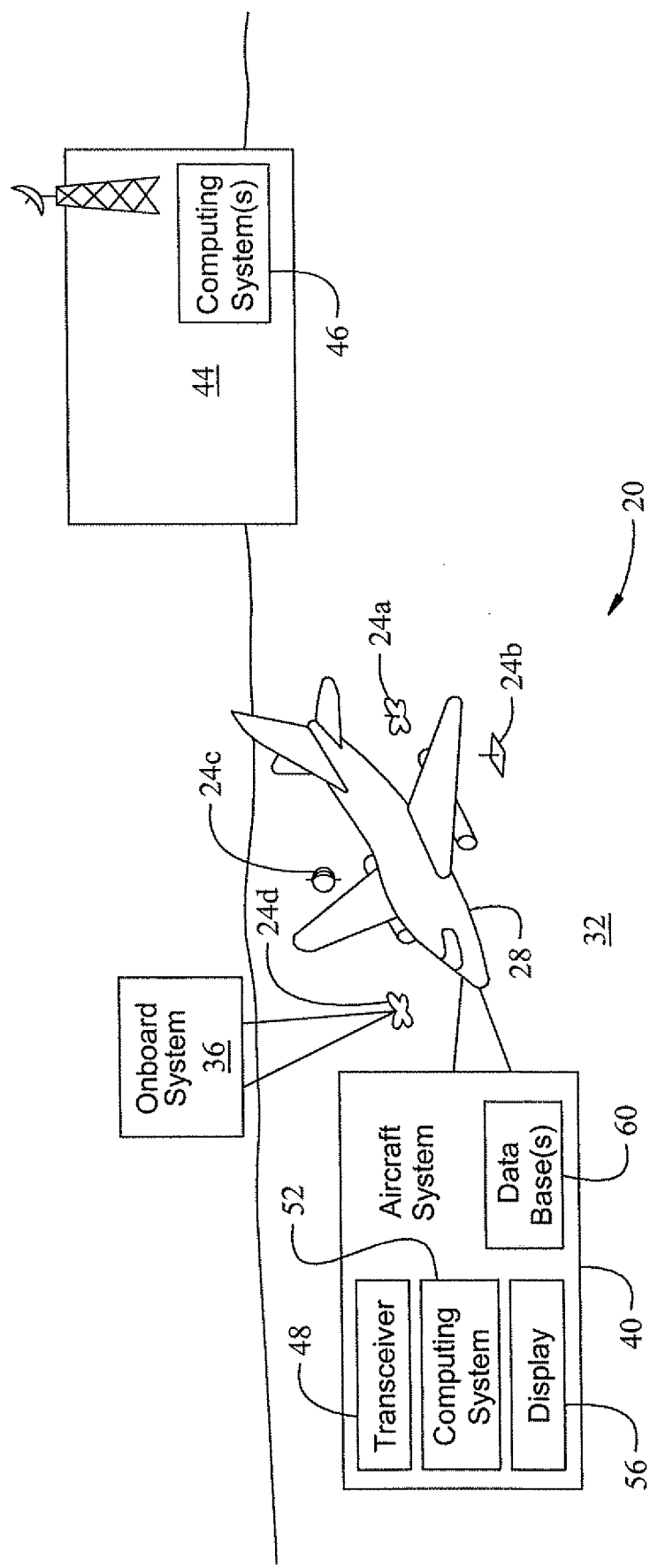
FIG. 1 is a diagram of a system for inspecting an aircraft in accordance with one implementation of the disclosure.

The following description is merely exemplary in nature and is not intended to limit the present disclosure, application, or uses. It should be understood that throughout the drawings, corresponding reference numerals indicate like or corresponding parts and features.

Various implementations of the disclosure are directed to methods and systems in which an airplane preflight inspection is performed by unmanned, heterogeneous air and/or ground vehicles equipped with inspection sensors. Portions of the aircraft are assigned to the vehicles for inspection based on functional capability of each vehicle. The unmanned vehicles are configured to cooperatively use the sensors to perform the inspection. Information relating to the inspection is communicated, e.g., to a pilot of the aircraft. Inspections, e.g., for ice and/or visible damage may be autonomously performed by the unmanned vehicles, e.g., at the direction of the pilot while the airplane is parked at a ramp or at other locations on an airfield. In various implementations a task allocation system allocates regions of inspection of the aircraft between or among air and/or ground vehicles based on their capabilities. For example, a ground vehicle may be assigned to inspect landing gear and an aerial vehicle may be assigned to inspect the tail of the aircraft.

A system for inspecting an aircraft in accordance with one implementation of the disclosure is indicated generally in FIG. 1 by reference number 20. The system 20 includes a plurality of unmanned vehicles 24a-24d (UVs) that are used as a cooperative swarm to inspect an aircraft 28 on the ground 32. The aircraft 28 may be at an airport gate or at some other location, e.g., waiting to take off on or near an airport runway. In some implementations, the aircraft may be under cover, e.g., in a hangar.

In the present example the aircraft 28 is a commercial aircraft. It should be noted, however, that other or additional types of aircraft, including but not limited to military aircraft, could be inspected in accordance with various implementations of the disclosure. Although four UVs 24a-24d are shown in FIG. 1, more or fewer than four vehicles may be used as appropriate for a particular inspection. Each UV 24a-24d includes an onboard system 36 for navigation and for wireless communication, e.g., with other UVs, with various systems 40 of the aircraft 28, and optionally with one or more ground systems 44 located, e.g., at an airport control tower and/or an airport maintenance facility. Ground system(s) 44 typically include one or more computing systems 46.

Aircraft systems 40 used in communication with the UVs 24a-24d include a wireless transceiver 48 and a computing system 52 including one or more processors and memory. A display 56 is available, e.g., in the aircraft cockpit. The computing system 52 is configured to provide on the display 56 various kinds of information pertaining to an inspection, including but not limited to real-time video of aircraft conditions, simulated views of the UVs 24a-24d, and animations of various target conditions detected during an inspection. The computing system 52 may use data from one or more databases 60 relating to the aircraft. The database(s) 60 may include component and system information particular to the aircraft 28. Database(s) 60 may also include, e.g., an inspection history database in which results of previous inspections are stored, a flight data recorder database in which data from the last flight of the aircraft 28 is stored, and an aircraft flight schedule database.

Figure 2A:
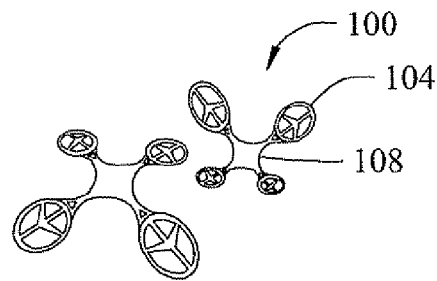
FIGS. 2A, 2B and 2C are perspective views of unmanned vehicles in accordance with one implementation of the disclosure.
Figure 2B:
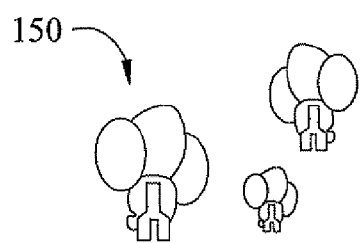
Figure 2C:

Examples of UVs that may be used in performing aircraft preflight inspection are shown in FIGS. 2A-2C. An unmanned quadrotor vehicle (QR) is indicated generally in FIG. 2A by reference number 100. The QR 100 is an aerial vehicle having four rotors 104 and a body 108 configured to allow the QR 100 to hover over or underneath an area of an aircraft being inspected. The QR 100 has one or more surface acoustic wave sensors (SAWS) useful, e.g., for quick detection of ice. The QR 100 also includes one or more ice growth optical scanners (IGOS) useful, e.g., for measuring thickness and spread of ice and for detecting dents, scratches, cracks, etc. on an aircraft. One or more electronic noses (ENOS) may be provided which are useful, e.g., for identifying fluids and gels.

An unmanned rigid dirigible (RD) is indicated generally in FIG. 2B by reference number 150. The RD 150 is an aerial vehicle that is larger and slower than a QR, has tighter control than a QR and can come closer to the aircraft than a QR. An RD may include one or more infrared ice detection sensors (IIDS) useful, e.g., for quick detection of ice and its growth. An RD may also include one or more ice growth optical scanners (IGOS), e.g., for measuring thickness and spread of ice.

An unmanned ground vehicle (GV) is indicated generally in FIG. 2C by reference number 180. The GV 180 has a low profile that allows the GV to travel under or adjacent to low-lying objects such as aircraft tires. A GV may include microwave ice detection sensors (MWIDS) for detection of ice and measurement of its thickness. The MWIDS may also be used to detect the presence of de-icing fluids. A GV 180 may also include infrared acoustical position sensors (IAPS) useful, e.g., for determining pressure, temperature, and wear on tires. It should be noted that the foregoing description of various sensors is exemplary only. Other or additional types of sensors could be used. Further, the foregoing description should not be construed to limit a given sensor type to use in relation to a particular vehicle. Various types of sensors could be, e.g., mixed and matched in relation to various types of vehicles.

Figure 3:
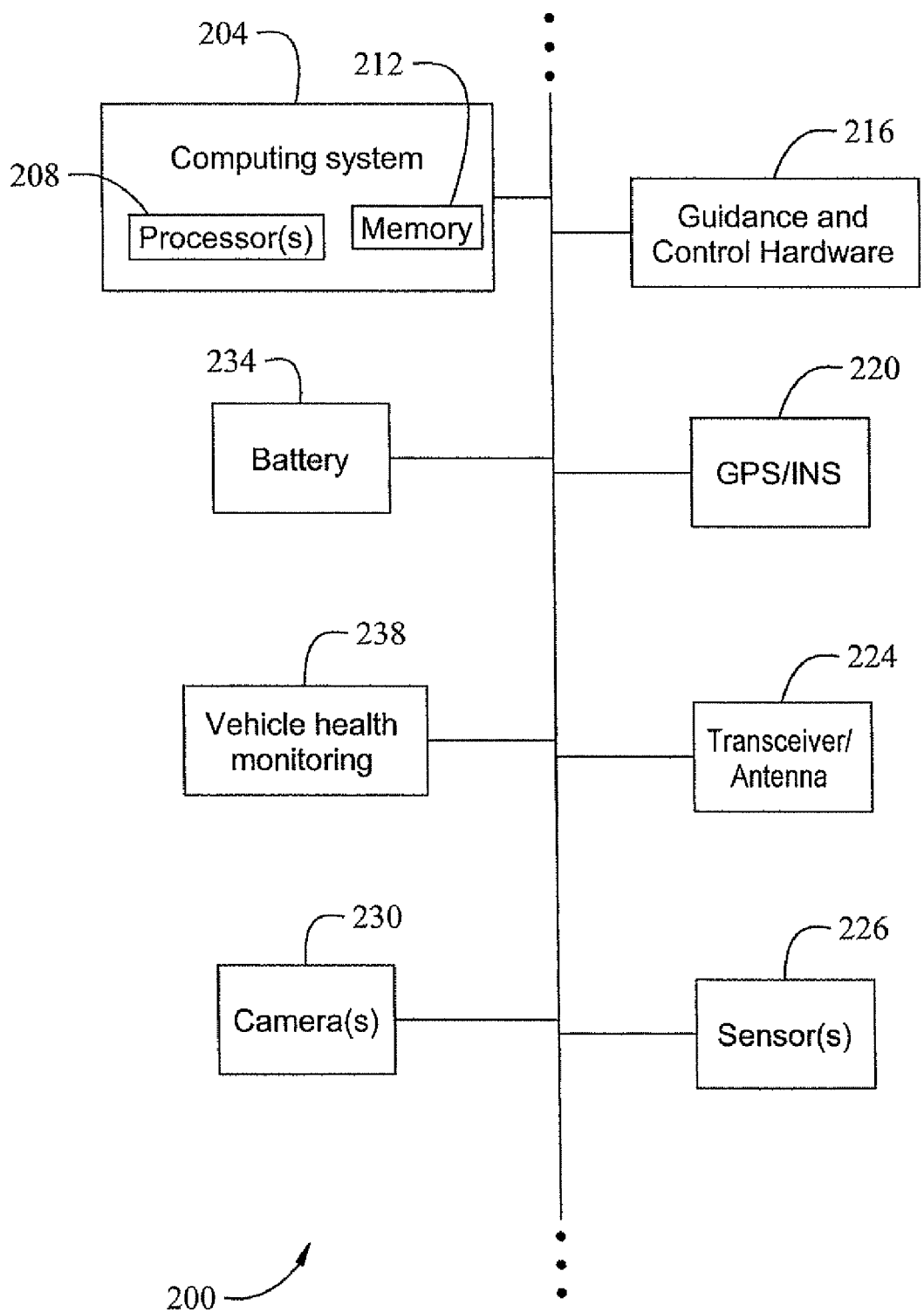
FIG. 3 is a block diagram of an unmanned vehicle onboard system in accordance with one implementation of the disclosure.

FIG. 3 is a block diagram of one configuration of an unmanned vehicle onboard system 200. It should be noted that components of the exemplary system 200 shown in FIG. 3 are common to most, although not necessarily all, UV onboard systems implemented in accordance with the disclosure. Onboard systems would vary, for example, according to vehicle type and configuration and types and numbers of vehicle sensors. A particular onboard system could include other or additional components, which may be provided dependent, e.g., on vehicle type and intended use.

The onboard system 200 includes a computing system 204 having one or more processors 208 and memory 212. The memory 212 may include static and/or dynamic memory. The computing system 204 may be used to provide guidance to and control for the UV. Data describing positioning and orientation of the vehicle may be used by the computing system 204 in communication with guidance and control hardware 216 to actuate the vehicle, e.g., to travel in a predetermined direction and/or assume and/or remain in a predetermined orientation. For such purpose the computing system 204 may use data from an onboard global positioning system (GPS)/inertial navigation system (INS) 220.

The computing system 204 may be used to implement aircraft inspection plans and tasks as further described below. Although a single computing system is shown for simplicity in FIG. 3, it should be noted that computing capabilities may be distributed, e.g., among various components and subsystems of a particular UV onboard system. In some configurations, aircraft inspection capabilities may be centrally implemented in a computing system 46 of the ground system 44 or in the aircraft system 52. The system 200 communicates wirelessly, e.g., with the systems 40 of the aircraft 28 and optionally with the ground system(s) 44 via a wireless transceiver/antenna 224.

Vehicle sensor(s), indicated generally by reference number 226, can vary as to type, configuration and/or number among heterogeneous vehicles, for example, as previously discussed with reference to FIGS. 2A-2C. The UV onboard system 200 also includes one or more cameras 230, including but not necessarily limited to a video camera. A battery 234 provides power to various UV components. A vehicle health monitoring system 238 monitors conditions of various vehicle components, including but not limited to accuracy of the sensors 226 and power output by the battery 234. Vehicle health reports may be transmitted to the aircraft 28 and/or ground system(s) 44. The computing system 204 can adapt guidance and control of the vehicle in response to changes in vehicle health and capabilities. For example, if the battery 234 is running out of power, the vehicle may be sent to its base and another vehicle dispatched to continue an inspection in its place, in order to ensure completion of inspection coverage.

Referring again to FIGS. 2A-2C, one or more of each type of UV 100, 150 and 180 may be used to perform an aircraft preflight inspection. In some implementations, areas of an aircraft are apportioned into inspection zones. A particular type of UV may be assigned to perform inspection in a zone based on functional capability, e.g., a travel mode and sensor suite, of the vehicle. It should be noted, however, that the above vehicles are exemplary only and that various types and configurations of vehicles and various types of sensors could be used in various implementations of the disclosure. Numbers and types of UVs could vary dependent on, e.g., the type of aircraft to be inspected, time allotted for an inspection, target conditions for which the inspection is conducted, etc.

Figure 4:
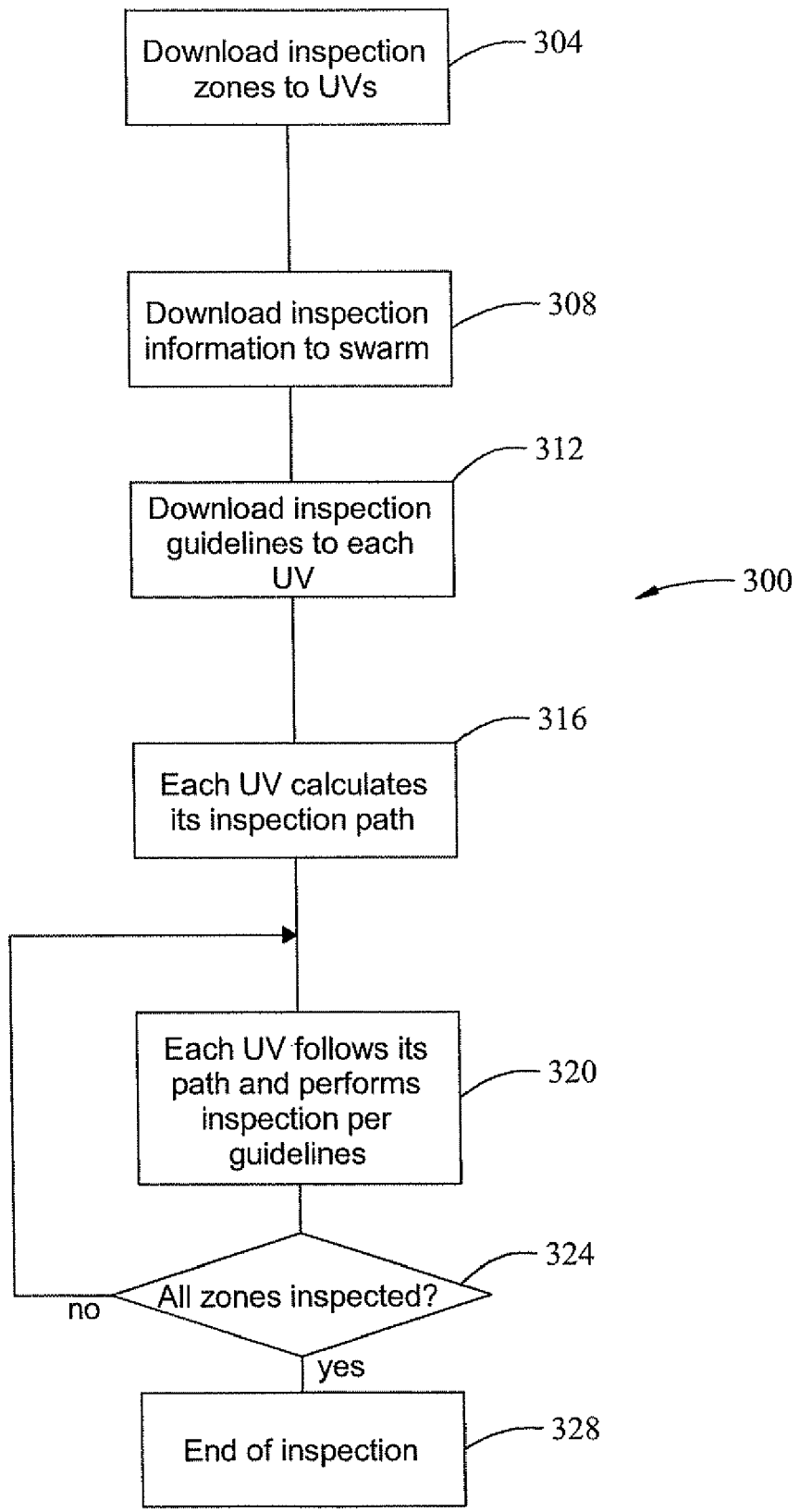
FIG. 4 is a flow diagram of a method of inspecting an aircraft in accordance with one implementation of the disclosure.
Figure 5A:
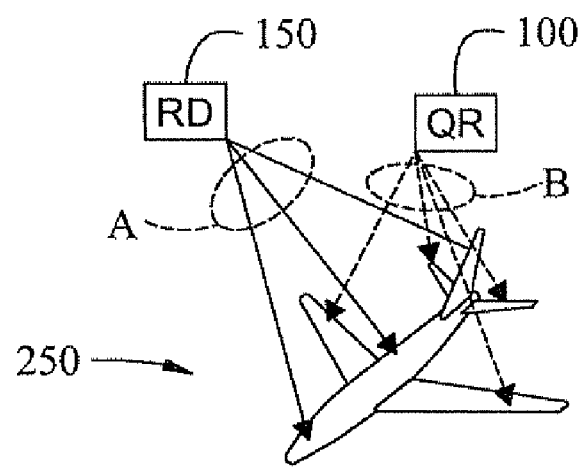
FIGS. 5A and 5B are diagrams showing apportionment of aircraft areas into inspection zones in accordance with one implementation of the disclosure.
Figure 5B:
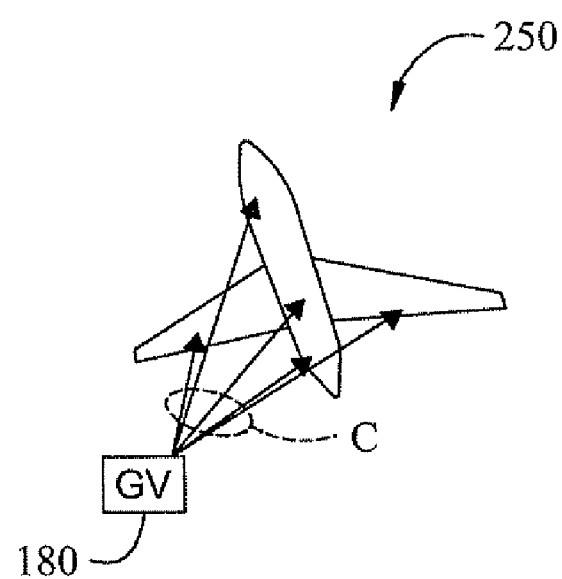

One implementation of a method of inspecting an aircraft is indicated generally in FIG. 4 by reference number 300. In step 304 areas of the aircraft are apportioned into zones for inspection by particular types of UVs. One implementation of apportionment of aircraft areas into inspection zones is indicated generally in FIGS. 5A and 5B by reference number 250. Aerial vehicles can be appropriately suited to view and obtain information pertinent to conditions of elevated areas of an aircraft. Accordingly, in the present example shown in FIG. 5A, one or more RDs 150 are assigned to inspect a zone "A", which includes various aircraft fuselage parts located above a lateral-most stringer, e.g., windows, vertical stabilizer, and antenna. One or more QRs 100 are assigned to inspect a zone "B", which includes various aircraft fuselage parts located below the lateral-most stringer. Zone "B" includes, for example, wings and horizontal stabilizer. In most cases a ground vehicle would be most appropriately suited to gain access to low-lying parts of an aircraft. Accordingly, as shown in FIG. 5B, one or more GVs 180 are assigned to inspect a zone "C", which includes the fuselage underside and nose and landing gears.

Referring again to FIG. 4, in step 308 information pertaining to the inspection is downloaded, e.g., from the aircraft to a swarm of UVs assigned to the inspection. Information may include, without limitation, mission identification, current weather conditions, asset requirements (e.g., numbers and types of UVs to be used), and/or asset allocations (e.g., assignments of UVs to zones). A mission may be the performance of one of a plurality of predefined inspection procedures. A mission could be, for example, the performance of a post-de-icing pre-flight inspection. Information also is downloaded, e.g., from a database provided by the aircraft manufacturer, that describes particular components and systems of the particular aircraft to be inspected.

Figure 6:
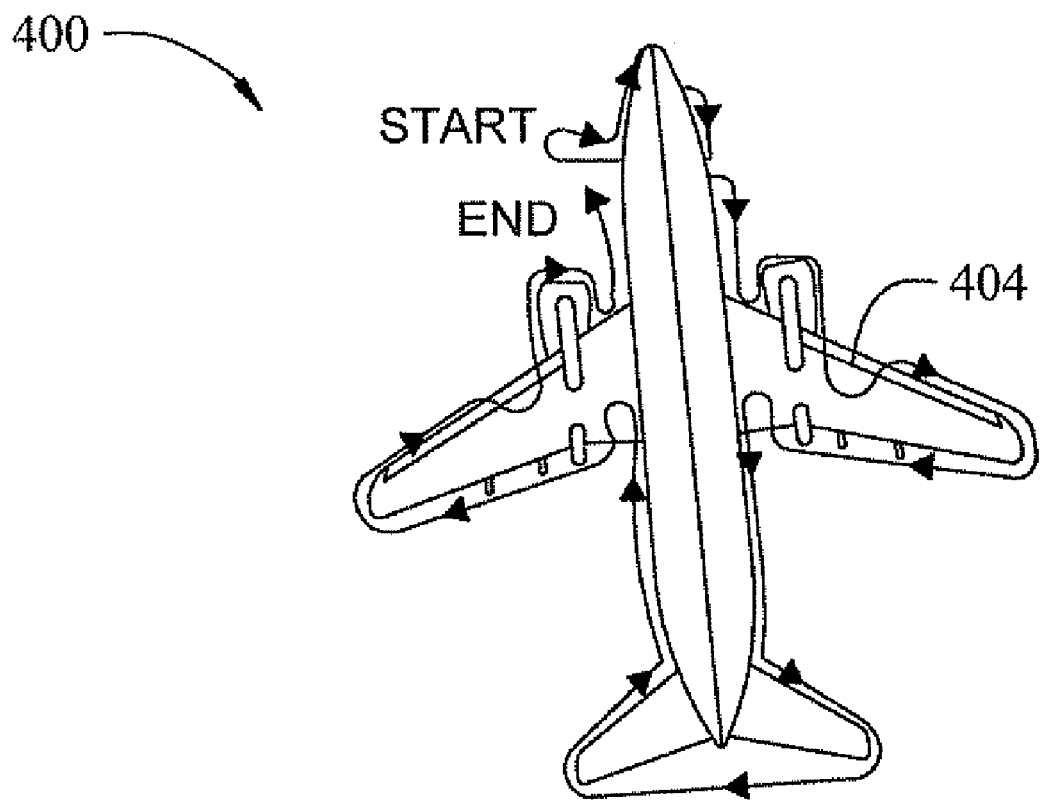
FIG. 6 is a diagram of an inspection path relative to an aircraft in accordance with one implementation of the disclosure.

In step 312 inspection guidelines for each aircraft part to be inspected are downloaded to each vehicle in the swarm. In step 316 each vehicle calculates its inspection path from an assigned start point to an assigned end point relative to the aircraft location. A diagram of one example of an inspection path relative to an aircraft is indicated generally in FIG. 6 by reference number 400. The path 400 goes around an aircraft 404 in the same or similar manner as a path that would be followed by a pilot performing a traditional pilot inspection, i.e., in a single clockwise cycle. It should be noted, however, that in an inspection by autonomous vehicles, different UVs may inspect different parts of an aircraft simultaneously. Thus in various implementations different UVs have different simultaneous inspection paths as further described below. Referring again to FIG. 4, in step 320 each UV follows its path and performs inspection tasks in accordance with the inspection guidelines received in step 312. When in step 324 it is determined that all zones have been inspected, then in step 328 the inspection is ended.

The UVs 100, 150 and 180 cooperate with one another in performing an inspection. Cooperation can take various forms. For example, two or more UVs may combine their sensing capabilities to provide data as to a particular condition. UVs also may cooperate in inspecting transitional areas connecting zones which are assigned to the respective UVs. When a UV is called to cooperate with another UV, retasking may be specified for one or more UVs, which adjust their assignments and/or paths accordingly.

Sensor data obtained by the UVs typically is converted to digital form and interpreted and/or displayed in real time, i.e., essentially instantaneously, by the aircraft computing system 52 to a pilot of the aircraft 28. The computing system 52 may analyze sensor data in many different ways. For example, sensor data relevant to a particular condition may be compared to a value range predetermined to represent "normal" values for that condition. Data from different sensors and/or from different types of sensors may be analyzed together to obtain an interpretation of a particular condition. Data from other sources, e.g., from database(s) 60, may also be used in analyzing sensor data from the UVs 100, 150 and/or 180. It can be appreciated that in view of the wide variety of sensor types and data sources that could be used in various implementations, many different approaches could be used to analyze and interpret sensor inspection data.

Figure 8A:
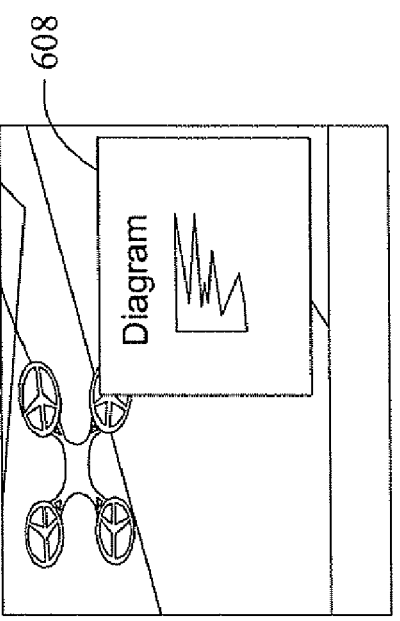
FIGS. 8A-8F are illustrations of animated views in accordance with one implementation of the disclosure.
Figure 8B:
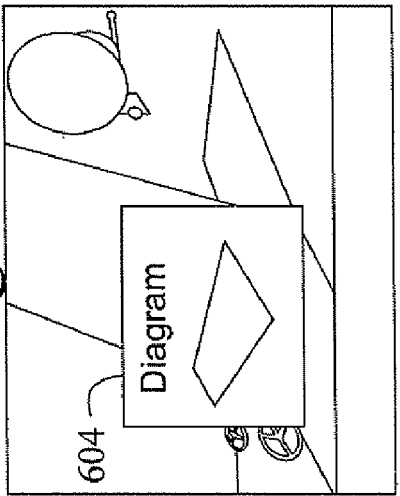
Figure 8C:
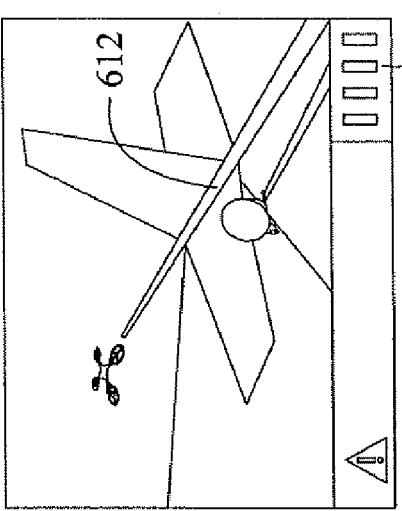
Figure 8D:
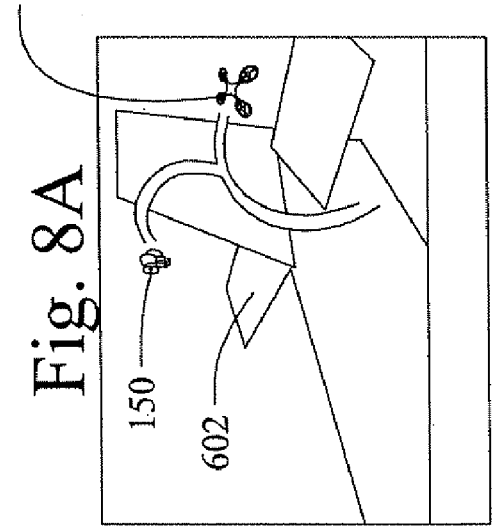
Figure 8E:
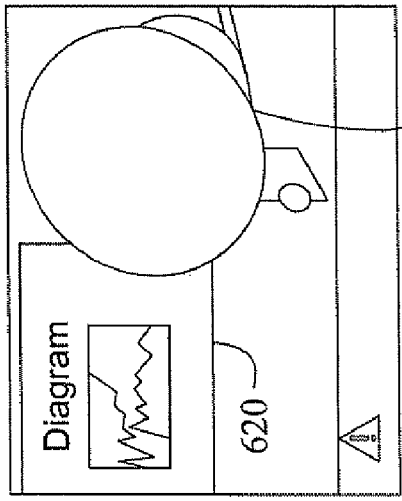
Figure 8F:
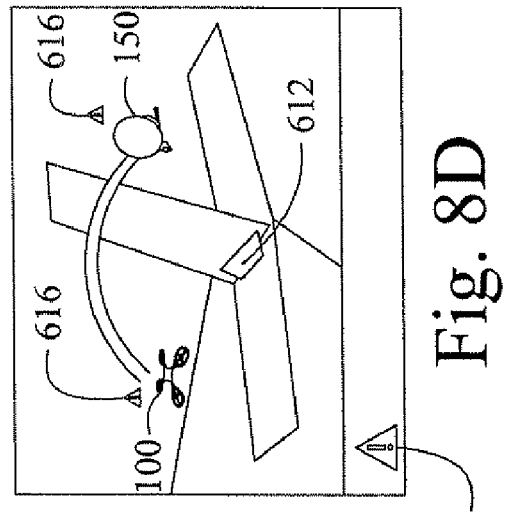

As UVs inspect various zones of an aircraft, one or more reports may be generated in real time and displayed to the pilot on the display 56. A printed list of exemplary inspection report excerpts is shown in FIGS. 7A-7C. Reports also may be provided in graphic, video and/or animated form. As an inspection is performed, animated views may be displayed of the UVs performing their tasks. For example, animated displays of parts of an inspection of an empennage area of an aircraft are shown in FIGS. 8A-8F. Commencement of the inspection by a QR 100 and a RD is shown in FIG. 8A. Areas to be inspected include an empennage area 602. The QR 100, RD 150 and a diagram 604 of the area 602 of the empennage are shown in FIG. 8B. In FIG. 8C are shown the QR 100 and a diagram 608 of wave sensor output from the QR 100. In FIG. 8D the QR 100 and RD 150 are shown inspecting a gap area 612 of the empennage. An alert icon 616 is displayed, to indicate, e.g., an inspection result of concern. In FIG. 8E the RD is shown approaching the area 612. A diagram 620 shows gel found in the inspection. In FIG. 8F the QR 100 and RD 150 are shown relative to the area 612. Graphics 624 are also displayed indicating the logging of an emergency and transmission of related data, e.g., to an operator of the aircraft.

Figure 9:
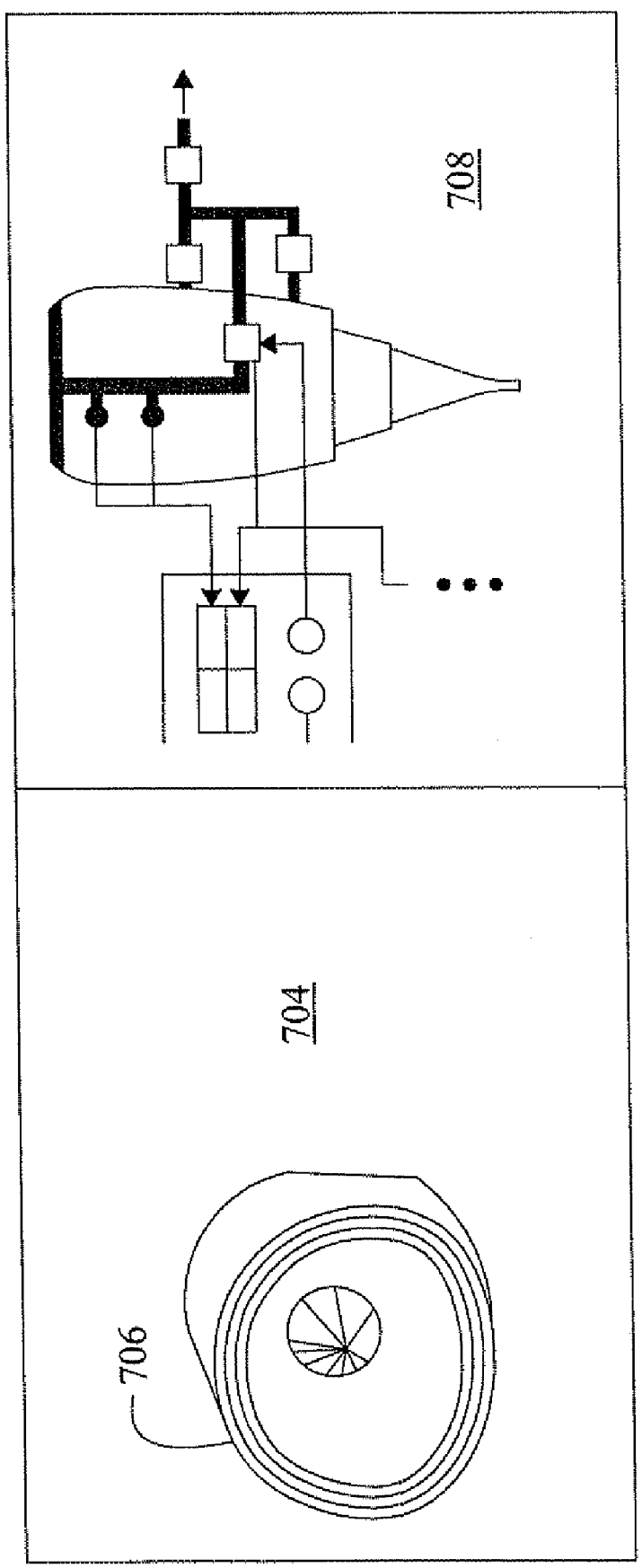
FIG. 9 is an illustration of an animated view in accordance with one implementation of the disclosure.

Views of conditions detected by the UVs may also be displayed, as actual video from an onboard UV camera and/or as an animation. For example, if a QR 100 senses heat on wing leading edge slats and/or on a crawl lip, animated images of the slats and/or lip may be displayed showing heat due to bleed air flow circulation. An animated view 704 of heat detected in a crawl lip is shown in FIG. 9. Various levels 706 of heat may be displayed, e.g., in colors corresponding to particular heat ranges. Modeling software packages such as Fluent, available from Ansys, Inc. at www.fluent.com may be used in providing such displays. Also shown in FIG. 9 is a view 708 of a schematic drawing of an anti-ice system for the aircraft being inspected. The schematic 708 may be provided, e.g., from a database 60 (shown in FIG. 1). Graphic and/or animated views of sensor readings may also be displayed.

Configurations of the foregoing system and methods can serve to reduce the time needed to perform preflight inspection on commercial airplanes. The need for a pilot to exit the cockpit, transit to plane side, and be exposed to weather and airport ramp hazards can be eliminated. Inspections can be performed of hard-to-access and high areas of airplanes. Airplane inspections can be performed completely and consistently. Configurations of the foregoing system and methods make it possible to conduct near-to-departure-time and post-deicing inspections when the aircraft is located away from the airplane ramp. Inspection results can be collected from inspection vehicles and can be stored in a database for archiving and possible future data mining.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. Further, it should be understood that unless the context clearly indicates otherwise, the term "based on" when used in the disclosure and/or the claims includes "at least partly based on", "based at least in part on", and the like.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of inspecting an aircraft comprising:
   using a plurality of heterogeneous unmanned, airborne vehicles operating as a cooperative swarm, to perform a preflight inspection of the aircraft, each said unmanned airborne vehicle having one or more sensors;
   assigning different designated portions of the aircraft to specific ones of the unmanned airborne vehicles for preflight inspection based on functional capability of each said unmanned airborne vehicle; and
   configuring the unmanned airborne vehicles to cooperatively use the sensors to perform the inspection.

2. The method of claim 1, wherein functional capability of at least one of the unmanned airborne vehicles comprises travel mode and sensor type.

3. The method of claim 1, further comprising receiving reports from the unmanned airborne vehicles as to performance of the inspection.

4. The method of claim 3, wherein receiving reports from the unmanned airborne vehicles comprises receiving a view of a condition in real time relating to the aircraft.

5. The method of claim 4, wherein the view is simulated.

6. The method of claim 3, wherein receiving reports from the unmanned airborne vehicles comprises receiving a simulated view of one or more of the vehicles in real time.

7. The method of claim 1, further comprising providing the unmanned airborne vehicles with configuration data for the aircraft for use in performing the inspection.

8. A system for inspecting an aircraft, the system comprising:
   a plurality of heterogeneous unmanned airborne vehicles, operating cooperatively as a swarm, and each having one or more sensors and a guidance and control system configured to allow each said unmanned airborne vehicle to operate autonomously; and
   one or more processors and memory configured to:
     instruct the unmanned airborne vehicles to cooperatively perform a preflight inspection of the aircraft using the sensors to obtain sensor data relating to a plurality of possible aircraft conditions, and with each said unmanned airborne vehicle inspecting a specific assigned portion of the aircraft; and
     interpret the sensor data to obtain inspection results.

9. The system of claim 8, further comprising a display, the one or more processors and memory configured to provide an animated interpretation of one or more conditions of the aircraft based on the sensor data.

10. The system of claim 8, further comprising a display, the one or more processors and memory configured to provide an animated view of one of the unmanned airborne vehicles during the inspection.

11. The system of claim 8, wherein the one or more processors and memory are configured to assign each said unmanned airborne vehicle to inspect a zone of the aircraft, and wherein two or more of the unmanned airborne vehicles are configured to cooperatively inspect a transition area of the aircraft between two of the zones.

12. The system of claim 8, wherein one of the unmanned airborne vehicles is configured to request assistance of another of the unmanned airborne vehicles to obtain sensor data.

13. The system of claim 8, wherein the one or more processors and memory are configured to interpret the sensor data using data from one or more databases related to the aircraft.

14. The system of claim 8, wherein one of the unmanned airborne vehicles is configured to obtain sensor data as to an object on or near the aircraft upon request by an operator of the aircraft.

15. A method of planning an inspection of an aircraft, the method comprising:
    assigning a plurality of heterogeneous unmanned vehicles to operate as a cooperative swarm to perform a preflight inspection of the aircraft, each said vehicle capable of using one or more sensors in cooperation with the other ones of the vehicles to perform the inspection;
    assigning each of a plurality of zones of the aircraft to specific ones of the vehicles based on functional capability of each vehicle; and
    assigning to each said vehicle one or more inspection tasks associated with the assigned zone.

16. The method of claim 15, further comprising selecting each of the unmanned vehicles based on at least one of the following: a shape of the unmanned vehicle, a travel mode of the unmanned vehicle, and a location of the aircraft.

17. The method of claim 15, further comprising providing the unmanned vehicles with configuration data for the aircraft for use in performing the inspection.

18. The method of claim 15, further comprising selecting one of a plurality of predefined plans for inspecting the aircraft.

19. The method of claim 15, further comprising providing to at least one of the unmanned vehicles information relating to current weather conditions.

20. The method of claim 15, further comprising providing respectively to each said unmanned vehicle inspection guidelines relating to aircraft parts to be inspected by each one of the unmanned vehicles.

* * * * *